(12) United States Patent
Hagen

(10) Patent No.: US 10,655,743 B2
(45) Date of Patent: May 19, 2020

(54) CARBIDE INSERT ASSEMBLY HAVING A FUSED RETAINER

(71) Applicant: FISHER CONTROLS INTERNATIONAL LLC, Marshalltown, IA (US)

(72) Inventor: Cory J. Hagen, Johnston, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/721,593

(22) Filed: Sep. 29, 2017

(65) Prior Publication Data

US 2019/0101221 A1    Apr. 4, 2019

(51) Int. Cl.
F16K 25/00    (2006.01)
F16K 27/02    (2006.01)
F16K 1/42     (2006.01)
C04B 35/56    (2006.01)

(52) U.S. Cl.
CPC ............ F16K 25/005 (2013.01); F16K 1/422 (2013.01); F16K 1/427 (2013.01); F16K 27/02 (2013.01); C04B 35/5626 (2013.01); F16K 1/42 (2013.01)

(58) Field of Classification Search
CPC . F16K 1/42; F16K 1/422; F16K 1/427; F16K 25/005; F16K 27/0272; F16K 27/02; F16K 1/32; F16K 1/36; C04B 35/5626
USPC .................................................. 251/360, 368
See application file for complete search history.

(56) References Cited

U.S. PATENT DOCUMENTS

| 2,301,355 | A | * | 11/1942 | Armentrout | E21B 34/02 138/45 |
| 2,598,187 | A | * | 5/1952 | Meyer | F16K 25/04 251/126 |
| 2,985,424 | A | * | 5/1961 | Anderson | F16K 1/34 251/332 |
| 3,122,160 | A | * | 2/1964 | Carr | F16K 17/0433 137/484.2 |
| 3,669,408 | A |   | 6/1972 | Baxter, Jr. | |
| 4,161,187 | A | * | 7/1979 | Bauer | F16K 1/34 137/375 |
| 4,446,883 | A | * | 5/1984 | Paul, Jr. | F16K 43/00 137/315.18 |
| 4,732,364 | A | * | 3/1988 | Seger | E21B 34/02 251/122 |
| 5,826,336 | A | * | 10/1998 | Schmitz | B23P 15/001 29/890.124 |
| 8,051,874 | B2 | * | 11/2011 | McCarty | F16K 25/005 137/375 |
| 9,249,888 | B2 | * | 2/2016 | McEvoy | F16K 27/0272 |

(Continued)

OTHER PUBLICATIONS

International Search Report and Written Opinion for International Application No. PCT/US2018/051015, dated Dec. 21, 2018.

*Primary Examiner* — Matthew W Jellett
(74) *Attorney, Agent, or Firm* — Marshall, Gerstein & Borun LLP

(57) ABSTRACT

A carbide insert assembly for use in a control valve having a valve stem, a flow passage, and a valve seat disposed in the flow passage. The carbide insert assembly includes a housing, a carbide insert disposed within the housing, and a metal retainer adjacent the carbide insert. The metal retainer is fused to the housing.

21 Claims, 4 Drawing Sheets

(56) References Cited

U.S. PATENT DOCUMENTS 9,822,894 B2 * 11/2017 Bayyouk ............... F16K 25/005
2011/0226980 A1 * 9/2011 Richardson ............. F16K 47/04
                                                              251/368

* cited by examiner

CARBIDE INSERT ASSEMBLY HAVING A FUSED RETAINER

FIELD OF THE INVENTION

The disclosure relates generally to control valves and, and more particularly, to a control valve having a carbide insert retained by a fused metal retainer.

BACKGROUND

In many control valve applications, and particularly in control valve applications involving severe service conditions, the internal components of the control valve may be subject to three phase flow with, for example, possible flashing, cavitation, and particles, all of which can potentially cause severe erosion and/or vibration. Consequently, such valves are often provided with carbide inserts that are corrosion resistant. The carbide inserts may be made of a ceramic material such as carbide, tungsten carbide, or other suitable materials.

In construction of such valve components, the carbide insert is typically attached to a housing using a shrink fit procedure where a metal retainer is heated, fitted, and then cooled to secure the carbide insert in place. It is possible that stress risers may be formed at the juncture between the carbide insert and the underlying base. Such stress risers can and sometimes do contribute to premature failure of the carbide insert by contributing to the formation and/or propagation of cracks in the carbide insert. Furthermore, temperature changes can cause the metal retainers to expand, thereby reducing the effectiveness of the metal retainer.

Other construction techniques include using mechanical stops, such as snap rings. However, mechanical stops may become unreliable during severe service conditions.

Referring now to FIG. 1, one known example of a flow control valve 10 includes a valve housing 12 having a fluid inlet 14 and a fluid outlet 16 connected by a fluid passageway 18. A trim assembly 20 is disposed within the valve housing 12 between the fluid inlet 14 and the fluid outlet 16. The trim assembly 20 includes a skirt 22 and a seat ring 24. A fluid control member, such as a plug 26 is disposed at least partially within the skirt 22 and the plug 26 interacts with the seat ring 24 to control fluid flow through the valve housing 12. The skirt 22 guides the plug 26 in reciprocating motion so that the plug 26 remains correctly aligned with the seat ring 24. A stem 28 is connected to the plug 26 at one end and to an actuator at another end. The actuator controls movement of the plug 26 within the skirt 22. A carbide insert assembly 29 includes a carbide insert 30, which is located within the valve housing 12, downstream of the seat ring 24. The carbide insert 30 may be attached to the valve housing 12 with a threaded connection 32. In other embodiments, the carbide insert 30 may be attached to the valve housing 12 by a shrink fit metal retainer (not shown) or by a mechanical stop (not shown), as discussed above.

DETAILED DESCRIPTION

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

Figure 1:
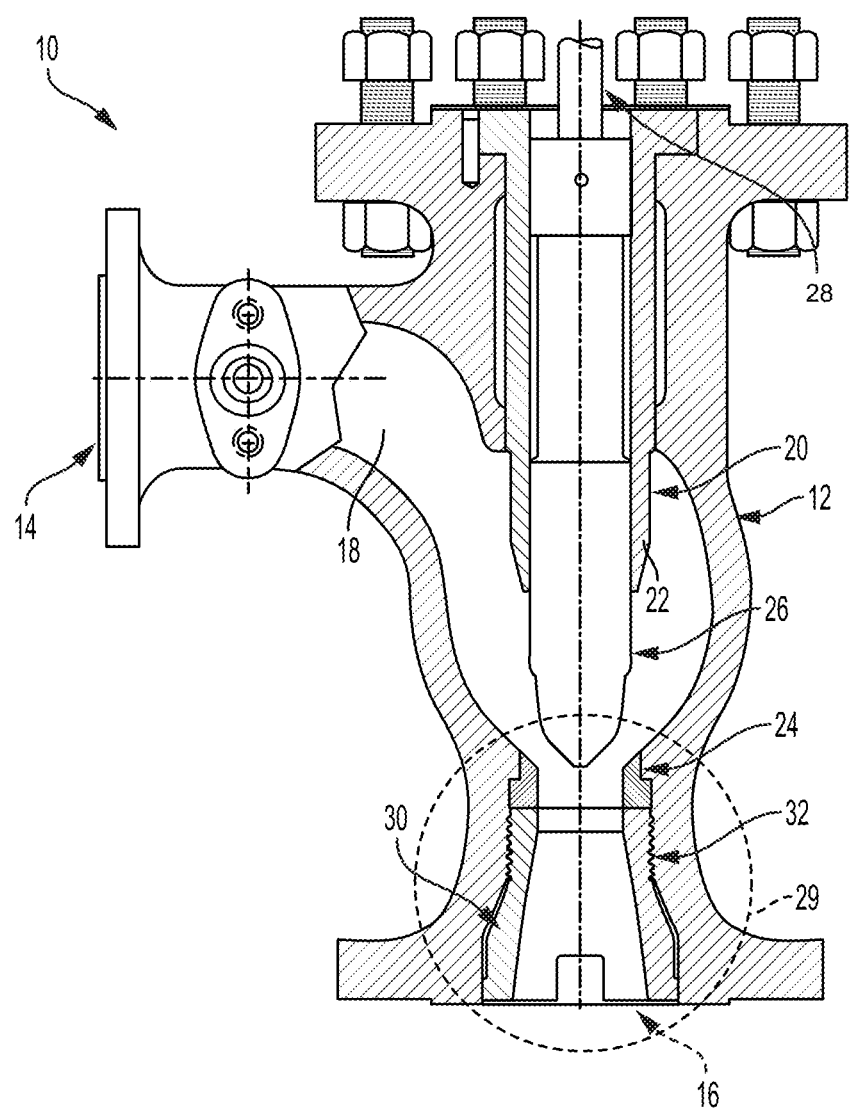
FIG. 1 is an enlarged view, partly in cross-section, of a conventional flow control valve having a carbide insert in a valve housing.
Figure 2:
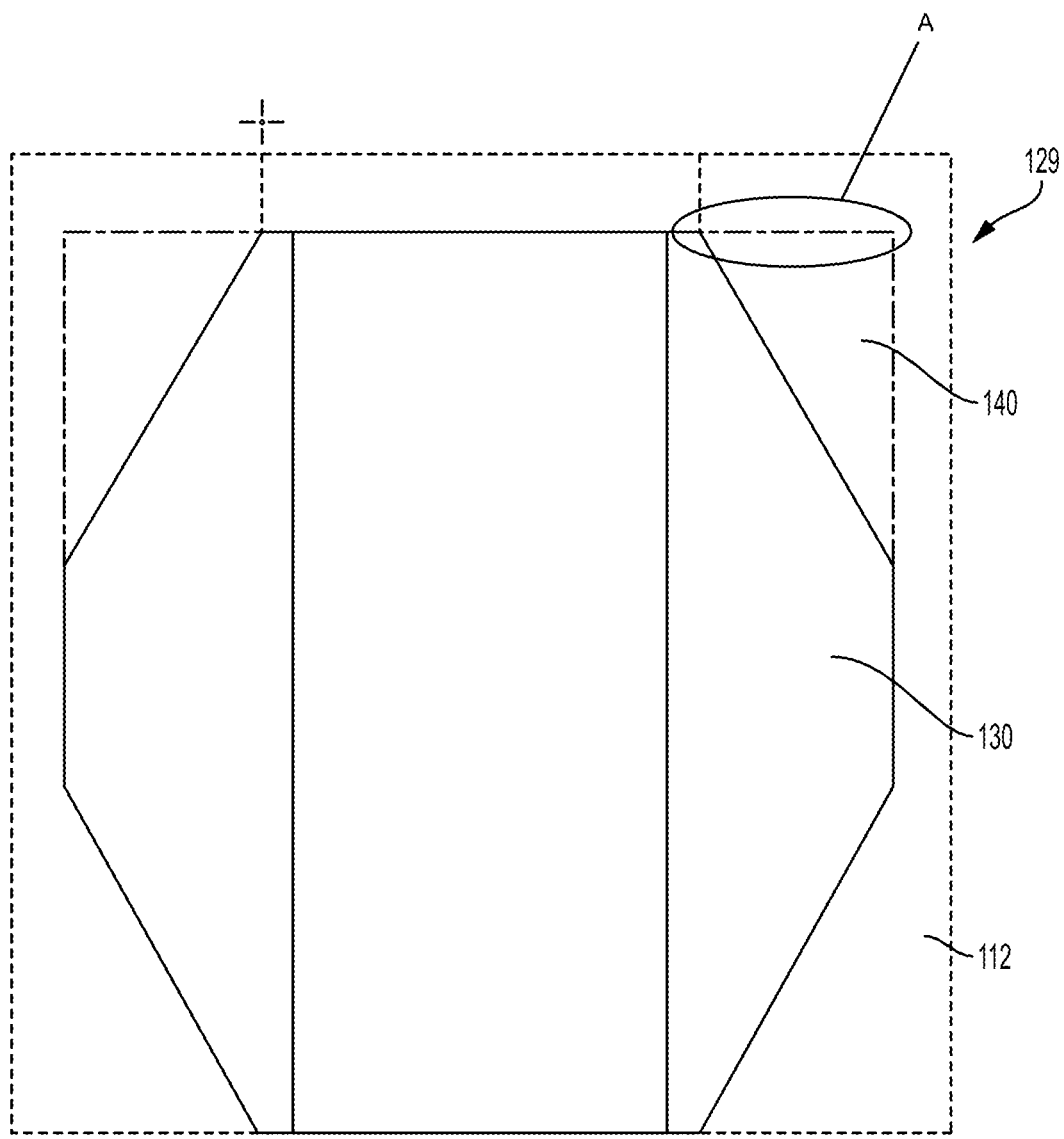
FIG. 2 is a schematic representation of a carbide insert assembly constructed in accordance with the teachings of the disclosure.

Referring now to FIG. 2, a first embodiment of a carbide insert assembly 129 is illustrated. The disclosed carbide insert assembly 129 may be incorporated into valves such as the control valve 10 in FIG. 1, by replacing the known carbide insert assembly 29 with the carbide assemblies 129, 229, 329, disclosed hereinafter.

The carbide insert assembly 129 includes a carbide insert 130, a metal retainer 140, and a housing 112. The metal retainer 140 may be located at either end of the carbide insert 130. The metal retainer 140 is fused to the housing 112 along at least one surface A. In some embodiments, the metal retainer 140 may be fused to the housing 112 along more than one surface. In one embodiment, the metal retainer 140 is fused to the housing 112 by laser sintering. In other embodiments, the metal retainer 140 may be fused to directly to a valve housing. In yet other embodiments, the metal retainer 140 may be fused to another element that carries a carbide insert, such as a valve plug. Regardless, fusing the metal retainer 140 to the housing 112, secures the carbide insert 130 in position while compensating for thermal expansion during temperature changes and while shielding the carbide insert 130 from the fusing process.

The disclosed carbide insert assembly may be advantageously used in process environments for industries such as chemical, refining, pulp and paper, and mining, all of which involve harsh operating conditions. While a sliding stem valve is illustrated in the drawings, the disclosed carbide assemblies 129, 229, 329 may be incorporated into virtually any type of control valve that utilizes a carbide insert. For example, the disclosed carbide assemblies 129, 229, 329 may be incorporated into one or more of sliding stem valves, rotary valves, sliding gate valves, globe valves, or virtually any other type of control valve.

The disclosed carbide insert assembly is more thermally tolerant when compared to other carbide retention mechanisms because traditional metal retainers have different thermal expansion coefficients than the carbide insert, and therefore, the traditional metal retainers expand at different rates than the carbide inserts, causing traditional metal retainers to lose effectiveness during temperature changes. The disclosed carbide assemblies do not lose retention effectiveness during temperature changes.

Figure 3:
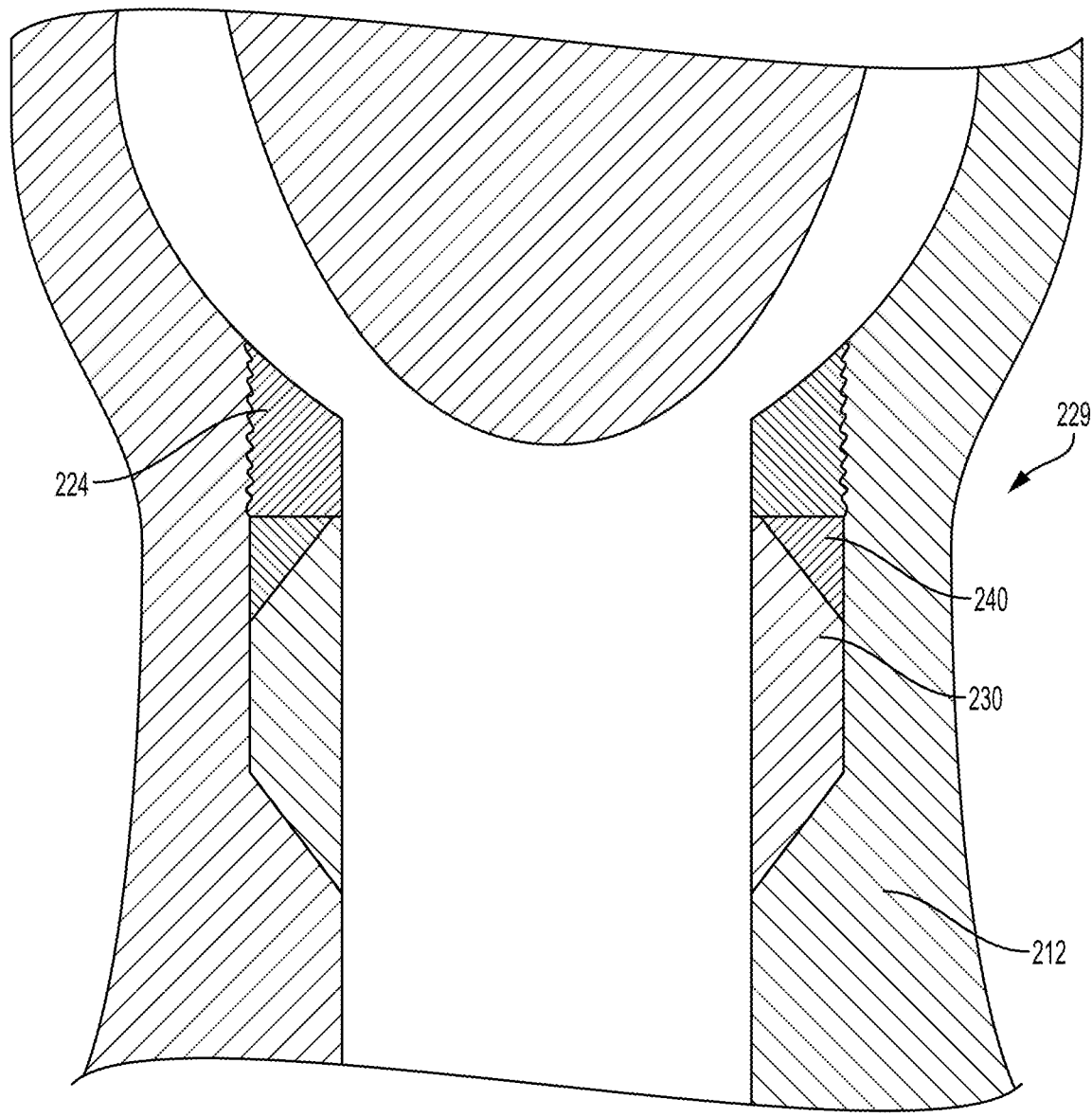
FIG. 3 is a first embodiment of a control valve including the carbide insert assembly of FIG. 2.

Turning now to FIG. 3, a second embodiment of a carbide insert assembly 229 is illustrated. In the embodiment of FIG. 3, the carbide insert assembly 229 includes a carbide insert 230, a valve housing 212, a metal retainer 240, and a seat ring 224. The metal retainer 240 is located between the carbide insert 230 and the seat ring 224. The metal retainer 240 is fused to the valve housing 212 to secure the carbide insert 230 in place. The seat ring 224 is secured to the valve housing 212 with a threaded connection.

During assembly of the embodiment of FIG. 3, the carbide insert 230 is inserted into the valve housing 212 from above in FIG. 3. Next, the metal retainer 240 is inserted into the valve housing 212 above the carbide insert 230 and the metal retainer 240 is fused to the valve housing 212, by for example laser sintering. Finally, the seat ring 224 is inserted into the valve housing 212 and secured in place by the threaded connection.

Figure 4:
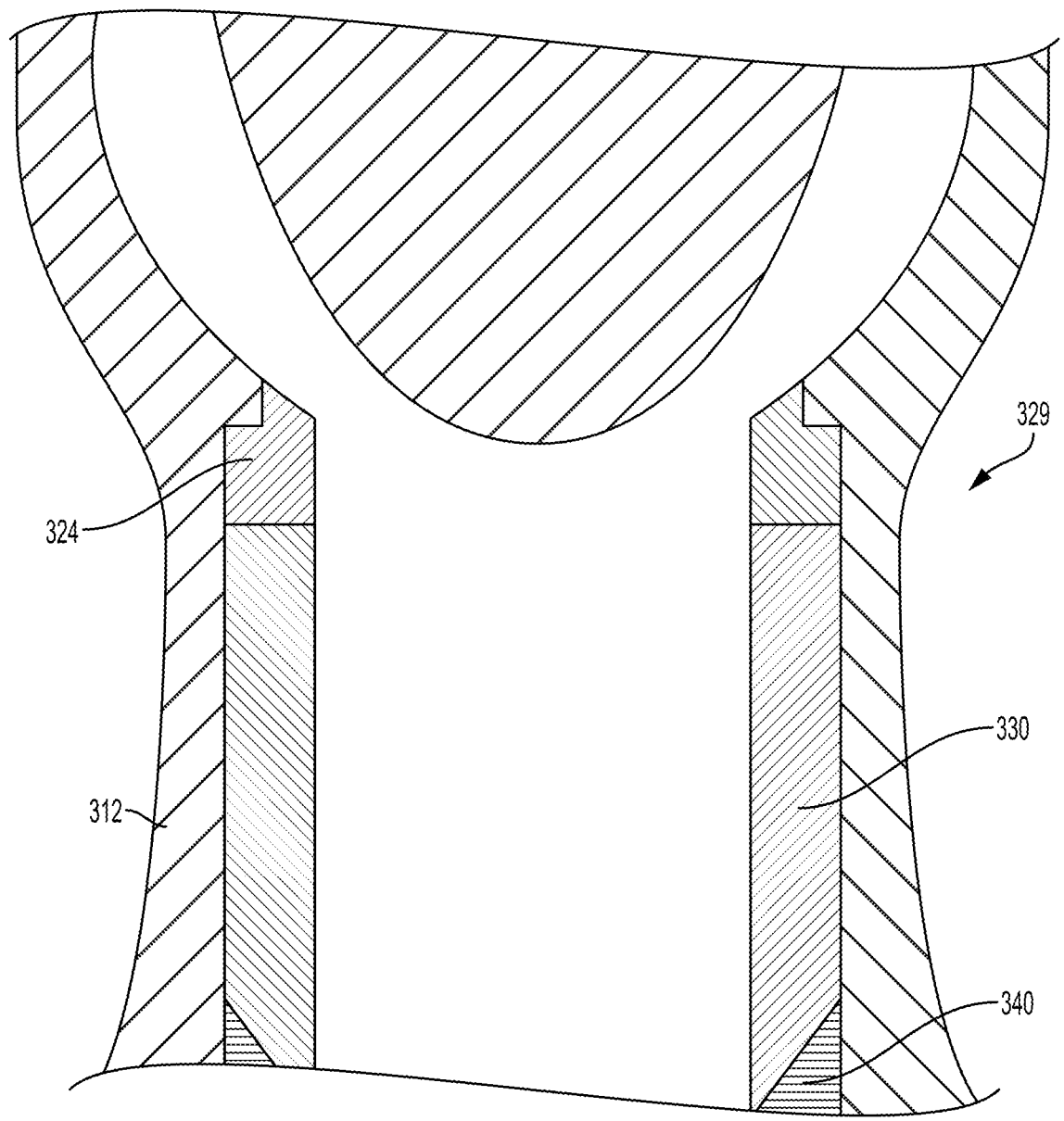
FIG. 4 is a second embodiment of a control valve including the carbide insert assembly of FIG. 2.

Turning now to FIG. 4, a third embodiment of a carbide insert assembly 329 is illustrated. In the embodiment of FIG. 4, the carbide insert assembly 329 includes a carbide insert 330, a valve housing 312, a metal retainer 340, and a seat ring 324. The carbide insert 330 is located between the metal retainer 340 and the seat ring 324. The metal retainer 340 is fused to the valve housing 312 to secure the carbide insert 330 in place. The seat ring 324 is secured to the valve housing 312 by compression between the carbide insert 330 and a shoulder in the valve housing 312.

During assembly of the embodiment of FIG. 4, the seat ring 324 is inserted into the valve housing 312 from below in FIG. 4. Next, the carbide insert 320 is inserted into the valve housing 312 from below and pushed up against the seat ring 324 Next, the metal retainer 340 is inserted into the valve housing 312 below the carbide insert 330 and the metal retainer 340 is fused to the valve housing 312, by for example laser sintering.

In the embodiments of FIGS. 2-4, the carbide insert 330 may be formed from one or more of carbide and tungsten carbide. The metal retainer may be formed from other wear resistant materials as well.

While the embodiments of FIGS. 2-4 illustrate the metal retainer 140, 240, 340 as an annular ring with a triangular cross-sectional shape, the metal retainer 140, 240, 340 can take on virtually any shape, continuous or discontinuous, that secures the carbide insert into the housing.

When constructed, a carbide insert assembly assembled in accordance with the exemplary teachings outlined herein may offer one or more technical advantages not achievable with prior art teachings. For example, the disclosed carbide insert assembly is more temperature tolerant than conventional carbide attachments. Further, the disclosed carbide insert assembly is less prone to failure during severe service conditions than conventional carbide attachments. Still further, the use of select materials outlined herein free manufacturers from stringent requirements of shrink fit construction by allowing the use of lower cost, readily available, and standard materials.

Another potential technical advantage is the disclosed aspects facilitate easier maintenance by allowing the end user to retrofit a worn carbide insert, instead of replacing the entire valve.

When compared to prior art structure and assembly, one or more aspects of the present invention inhibit the development of harmful and hard-to-control internal stresses resulting from prior construction, such as may be found in the shrink fit process.

When compared to prior art structure and assembly, one or more aspects of the present invention result in an assembly that offers better performance and longevity over a wider temperature range, which offers advantages over the prior art structure and method. This may be especially true for larger valve trim sizes.

Compared to conventional mechanical fastening and clamping, one or more aspects of the present disclosure promote control of stresses on the carbide insert, the valve housing, and other components, again favoring better performance over a wider temperature range.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A carbide insert assembly for use in a control valve having a valve stem and a flow passage, the carbide insert assembly comprising:
   a housing having an inner radial surface defining a recess;
   a valve seat at least partially disposed within the recess of the housing and adapted to be disposed in the flow passage;
   a carbide insert at least partially disposed within the recess of the housing; and
   a metal retainer at least partially disposed within the recess of the housing adjacent the carbide insert, the metal retainer being fused to the housing and being structurally separate from the carbide insert,
   wherein the carbide insert has a first outer radial surface directly engaging the inner radial surface of the housing, wherein the metal retainer has a second outer radial surface directly engaging the inner radial surface of the housing, the first and second outer radial surfaces being aligned along a common axis, and wherein the valve seat has a third outer radial surface directly engaging the inner radial surface of the housing.

2. The carbide insert assembly of claim 1, wherein the metal retainer is fused to the housing by laser sintering.

3. The carbide insert assembly of claim 1, wherein the carbide insert is made from one of carbide and tungsten carbide, and any combinations thereof.

4. The carbide insert assembly of claim 1, wherein the metal retainer is annular in shape.

5. The carbide insert assembly of claim 4, wherein the metal retainer has a triangular cross-section.

6. A carbide insert assembly for use in a control valve having a valve stem and a flow passage, the carbide insert assembly comprising:
   a housing having an inner radial surface defining a recess;
   a valve seat adapted to be disposed in the flow passage;
   a carbide insert at least partially disposed within the recess of the housing; and
   a metal retainer at least partially disposed within the recess of the housing adjacent the carbide insert, the metal retainer being fused to the housing and being structurally separate from the carbide insert,
   wherein the carbide insert has a first outer radial surface directly engaging the inner radial surface of the housing, wherein the metal retainer has a second outer radial surface directly engaging the inner radial surface of the housing, the first and second outer radial surfaces being aligned along a common axis, and
   wherein the metal retainer is disposed between the carbide insert and the valve seat.

7. The carbide insert assembly of claim 1, wherein the carbide insert is disposed between the metal retainer and the valve seat.

8. A control valve comprising:
   a valve housing having an inlet and an outlet connected by a fluid passageway, the valve housing also having an inner radial surface defining a recess;
   a movable valve stem at least partially disposed within the valve housing;

a movable control member disposed within the fluid passageway and carried by the movable valve stem, the movable control member cooperating with the valve seat to control a flow of fluid through the valve housing; and a carbide insert assembly, comprising:
- a valve seat removably connected to the valve housing within the fluid passageway;
- a carbide insert disposed within the valve housing and within the fluid passageway, the carbide insert at least partially disposed within the recess of the valve housing; and
- a metal retainer adjacent the carbide insert, the metal retainer being fused to the valve housing, wherein the valve seat is structurally separate from the carbide insert assembly, and wherein the carbide insert has a first outer radial surface directly engaging the inner radial surface of the valve housing, the metal retainer has a second outer radial surface directly engaging the inner radial surface of the valve housing, and the valve seat has a third outer radial surface directly engaging the inner radial surface of the valve housing.

9. The control valve of claim 8, wherein the metal retainer is fused to the valve housing by laser sintering.

10. The control valve of claim 8, wherein the carbide insert is made from one of carbide and tungsten carbide, and any combinations thereof.

11. The control valve of claim 8, wherein the metal retainer is annular in shape.

12. The control valve of claim 11, wherein the metal retainer has a triangular cross-section.

13. The control valve of claim 8, wherein the metal retainer is disposed between the carbide insert and the valve seat.

14. The control valve of claim 8, wherein the carbide insert is disposed between the valve seat and the metal retainer.

15. A method of fixing a carbide insert assembly in a valve housing, the method comprising:

providing a carbide insert having a first outer radial surface;

inserting the carbide insert at least partially into a recess in a valve housing defined by an inner radial surface of the valve housing, such that the first outer radial surface of the carbide insert directly engages the inner radial surface of the valve housing and the carbide insert is disposed within a fluid flow path in the valve housing;

arranging a metal retainer adjacent to one end of the carbide insert and at least partially into the recess in the valve housing, such that a second outer radial surface of the metal retainer directly engages the inner radial surface of the valve housing and the first and second outer radial surfaces are aligned along a common axis;

arranging a valve seat at least partially in the recess in the valve housing such that a third outer radial surface of the valve seat directly engages the inner radial surface of the valve housing; and fusing the metal retainer to the valve housing, wherein the carbide insert is shielded from the fusing, such that the carbide insert is not fused to the valve housing and is structurally separate from the metal retainer.

16. The method of claim 15, wherein the step of fusing the metal retainer to the valve housing includes laser sintering.

17. The method of claim 15, further comprising abutting the valve seat against the metal retainer.

18. The method of claim 15, further comprising abutting the carbide insert against the valve seat.

19. The control valve of claim 8, wherein the carbide insert assembly is located downstream of the seat ring.

20. The control valve of claim 8, wherein the carbide insert is not fused to the valve housing, such that the carbide insert is structurally separate from the metal retainer.

21. The control valve of claim 8, wherein the first and second outer radial surfaces are aligned along a common axis.

* * * * *

UNITED STATES PATENT AND TRADEMARK OFFICE
CERTIFICATE OF CORRECTION

PATENT NO. : 10,655,743 B2
APPLICATION NO. : 15/721593
DATED : May 19, 2020
INVENTOR(S) : Cory J. Hagen Page 1 of 1

It is certified that error appears in the above-identified patent and that said Letters Patent is hereby corrected as shown below:

In the Specification

At Column 2, Line 33, "fused to" should be -- fused --.

At Column 3, Line 25, "324 Next," should be -- 324. Next, --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*